(12) United States Patent
Minden et al.

(10) Patent No.: US 7,342,947 B1
(45) Date of Patent: *Mar. 11, 2008

(54) DARK FIBER LASER ARRAY COUPLER

(75) Inventors: Monica Minden, Monte Nido, CA (US); Hans W. Bruesselbach, Monte Nido, CA (US)

(73) Assignee: HRL Laboratories, LLC, Mailbu, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 10/893,105

(22) Filed: Jul. 15, 2004

(51) Int. Cl.
*H01S 3/30* (2006.01)
*G02B 6/26* (2006.01)

(52) U.S. Cl. .......................... 372/6; 385/43
(58) Field of Classification Search ............ 372/6; 385/43
See application file for complete search history.

(56) References Cited

U.S. PATENT DOCUMENTS

| | | | |
|---|---|---|---|
| 4,360,372 A | 11/1982 | Maciejko | 65/4.21 |
| 4,757,268 A | 7/1988 | Abrams et al. | 330/4.3 |
| 4,915,467 A | 4/1990 | Berkey | 385/43 |
| 4,932,747 A | 6/1990 | Russell et al. | 350/96.24 |
| 5,045,100 A | 9/1991 | Smith et al. | 65/410 |
| 5,175,779 A | 12/1992 | Mortimore | 385/43 |
| 5,303,373 A | 4/1994 | Harootian | 385/115 |
| 5,396,506 A | 3/1995 | Ball | 372/6 |
| 5,408,556 A | 4/1995 | Wong | 385/48 |
| 5,566,196 A | 10/1996 | Scifres | 372/6 |
| 5,852,699 A | 12/1998 | Lissotschenko et al. | 385/115 |
| 5,881,189 A | 3/1999 | Carberry et al. | 385/39 |
| 5,936,980 A | 8/1999 | Espindola et al. | 372/6 |
| 6,134,362 A | 10/2000 | Au-Yung et al. | 385/43 |
| 6,208,678 B1 | 3/2001 | King | 372/72 |
| 6,272,155 B1 | 8/2001 | Sekiguchi | 372/6 |
| 6,366,356 B1 | 4/2002 | Brosnan et al. | 356/477 |
| 6,400,871 B1 | 6/2002 | Minden | 385/39 |
| 6,411,762 B1 | 6/2002 | Anthon et al. | 385/123 |
| 6,434,302 B1 | 8/2002 | Fidric et al. | 385/43 |
| 6,515,257 B1 | 2/2003 | Jain et al. | 219/121.73 |
| 6,827,500 B2 | 12/2004 | Basavanhally et al. | 385/80 |

(Continued)

FOREIGN PATENT DOCUMENTS

EP 0 547 335 A2 6/1993

(Continued)

OTHER PUBLICATIONS

U.S. Appl. No. 10/893,106, filed Jul. 15, 2004, Minden et al.

(Continued)

*Primary Examiner*—Minsun Harvey
*Assistant Examiner*—Marcia A. Golub
(74) *Attorney, Agent, or Firm*—Ladas & Parry LLP

(57) ABSTRACT

A multiple-fiber, stretched, fused and cleaved coupler designed to act as an output window to a fiber laser array or fiber-coupled laser array, in which the stretch, length and/or position of the fibers is chosen facilitate the in-phase oscillation of the lasers in the array. The in-phase oscillation of the lasers is facilitated by making one or more of the fibers interferometrically dark. The other fibers, the interferometrically lit ones, are made to have fairly uniform intensity under the same collimated illumination.

11 Claims, 4 Drawing Sheets

U.S. PATENT DOCUMENTS

| | | | |
|---|---|---|---|
| 6,862,386 B2 | 3/2005 | Corio et al. | 385/43 |
| 2003/0031415 A1 | 2/2003 | Gonthier et al. | 385/43 |
| 2003/0123801 A1 | 7/2003 | Rolston | 385/43 |
| 2004/0165620 A1 | 8/2004 | Rogers et al. | 372/6 |
| 2004/0165827 A1 | 8/2004 | Bruesselbach et al. | 385/46 |
| 2005/0163443 A1 | 7/2005 | Antos et al. | 385/123 |

FOREIGN PATENT DOCUMENTS

| | | |
|---|---|---|
| GB | 2 154 364 A | 9/1985 |
| GB | 2 191 873 A | 12/1987 |
| WO | 2004/001919 A1 | 12/2003 |
| WO | 2004/068652 A3 | 8/2004 |

OTHER PUBLICATIONS

Kapany, N.S., et al., "Coherent Interactions Between Optical Waveguides and Lasers." *Journal of the Optical Society of America,* vol. 58, No. 9, pp. 1176-1183 (Sep. 1968).

Kozlov, V.A., et al., "All-Fiber Coherent Beam Combining of Fiber Lasers," *Optics Letters,* vol. 24, No. 24, pp. 1814-1816 (Dec. 15, 1999).

Lyndin, N.M., et al., "Laser System Composed of Several Active Elements Connected by Single-Mode Couplers," *Quantum Electronics,* vol. 24, No. 12, pp. 1058-1061 (1994).

Morel, J., et al., "Coherent Coupling of an Array of $Nd^{3+}$-Doped Single-Mode Fiber Lasers by Use of an Intracavity Phase Grating," *Optics Letters,* vol. 18, No. 18, pp. 1520-1522 (Sep. 15, 1993).

Sabourdy, D., et al., "Efficient Coherent Combining of Widely Tunable Fiber Lasers," *Optics Express,* vol. 11, No. 2, pp. 87-97 (Nov. 22, 2002).

Sabourdy, D., et al., "Power Scaling of Fibre Lasers with All-Fibre Interferometric Cavity," *Electronics Letters,* vol. 38, No. 14, pp. 692-693 (Jul. 4, 2002).

Shirakawa, A., et al., "Coherent Addition of Fiber Lasers by Use of A Fiber Coupler," *Optics Express,* vol. 10, No. 21, pp. 1167-1172 (Oct. 21, 2002).

Kawasaki, B.S., et al., "Biconical-taper single-mode fiber coupler", Optical Society of America vol. 6, No. 7 (Jul. 1981).

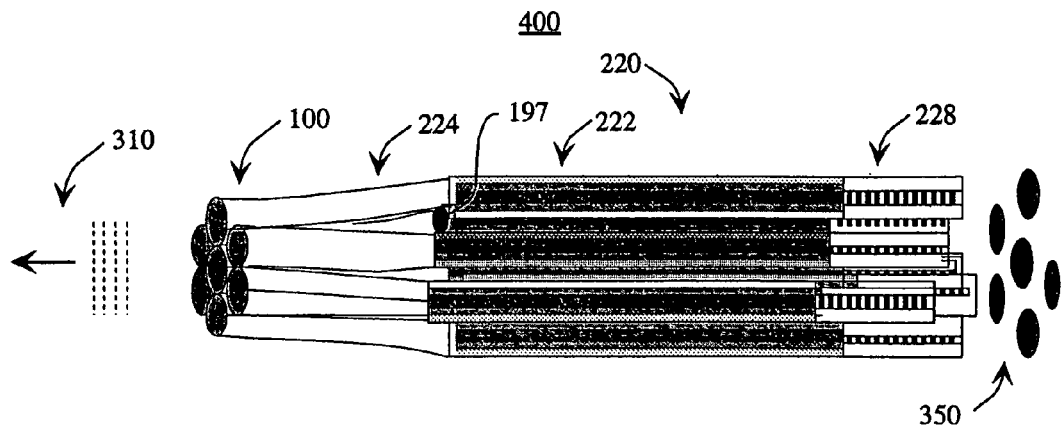
FIG. 4A
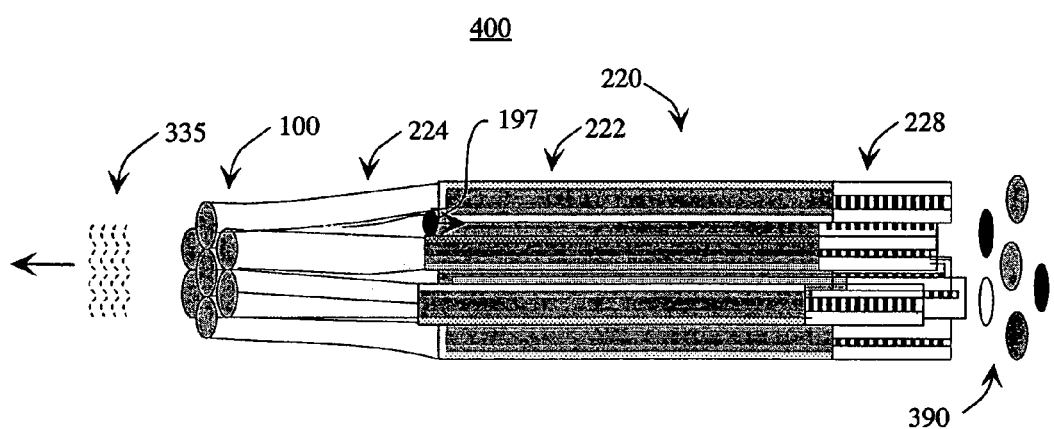
FIG. 4B
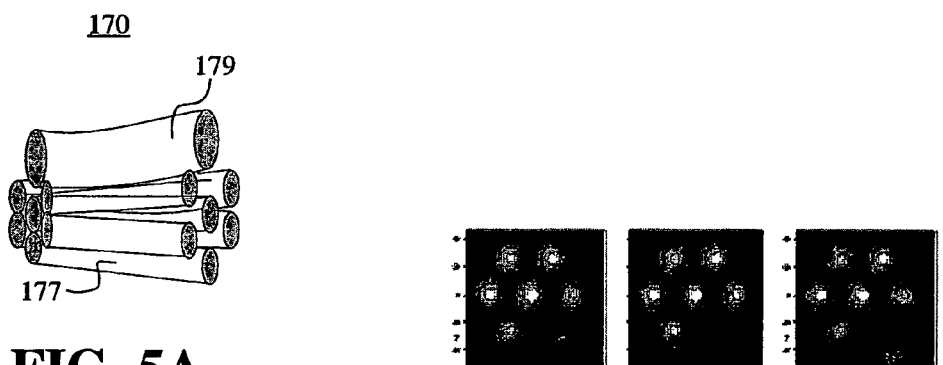
FIG. 5A
FIG. 5B

DARK FIBER LASER ARRAY COUPLER

STATEMENT REGARDING FEDERALLY SPONSORED RESEARCH OR DEVELOPMENT

The present invention was made with support from the United States Government under Contract No. MDA972-02-C-0050 awarded by the Defense Advanced Research Projects Agency (DARPA). The U.S. Government has certain rights in the invention.

CROSS-REFERENCE TO RELATED APPLICATIONS

The subject matter of the present application is related to co-pending U.S. patent application Ser. No. 10/893,106 filed of even date herewith and titled "Dark Fiber Laser Array Coupler" The contents of U.S. patent application Ser. No. 10/893,106 are incorporated by reference herein in their entirety.

The subject matter of the present application may be related to co-pending U.S. patent application Ser. No. 10/759,510 filed on Jan. 15, 2004 and titled "Method and Apparatus for Coherently Combining Multiple Laser Oscillators." The contents of U.S. patent application Ser. No. 10/759,510 are incorporated herein by reference in their entirety.

The subject matter of the present application may also be related to the co-pending U.S. patent application Ser. No. 10/759,511, filed on Jan. 15, 2004 and titled "Method and Apparatus for Combining Laser Light." The contents of U.S. patent application Ser. No. 10/759,511 are incorporated by reference herein in their entirety.

BACKGROUND

1. Field

This disclosure relates generally to lasers and more particularly to obtaining a flat wavefront coherent output from a laser oscillator array.

2. Description of Related Art

In this specification, the term "optical" is given the meaning used by those skilled in the art, that is, "optical" generally refers to that part of the electromagnetic spectrum which is generally known as the visible region together with those parts of the infrared and ultraviolet regions at each end of the visible region which are capable of being transmitted by dielectric optical waveguides such as optical fibers. Therefore, discussion of the output of laser devices in this specification includes optical outputs from such laser devices within the portions of the electromagnetic spectrum discussed immediately above.

Many potential laser applications such as laser communications, industrial material processing, and remote sensing require the use of laser sources producing high brightness light. High brightness light is typically considered to be light that can be focused into a diffraction-limited or near-diffraction-limited spot. Such high brightness light is typically generated by a single laser with a single transverse mode. A high power laser output typically requires the use of multiple laser sources. High power laser output generally does not demonstrate the flat wavefront coherent output typically seen with a single laser source and is, therefore, not usually classified as high brightness.

One method known in the art for providing a higher power laser output comprises directing the output from a master laser oscillator to several laser gain elements used as amplifiers. U.S. Pat. No. 4,757,268, issued Jul. 12, 1988 to Abrams et al., describes such a laser apparatus with N parallel laser gain elements. If the outputs of the N laser gain elements sum incoherently, a brightness equal to N times the brightness of a single laser gain element results. However, in Abrams et al., phase conjugate reflector means are disposed in the optical path of the laser gain elements to provide that the laser beams traveling through the individual laser gain elements sum coherently. This coherent summation of the laser beams provides that the resultant laser apparatus output will have a peak brightness proportional to $N^2$ times the brightness of a single laser gain element. Hence, coherent combination of laser outputs provides for substantial increases in laser output brightness.

The laser apparatus described by Abrams et al. uses a master oscillator comprising laser devices such as Nd:YAG crystals or diode lasers and several additional optical elements to ensure that the light traveling within the apparatus is properly polarized and directed. Hence, the apparatus described by Abrams et al. may be expensive and difficult to implement.

High power laser systems utilizing a fiber laser as a master oscillator are also known in the art. Fiber lasers are relatively compact and efficient, which reduces the power and weight requirements for systems based on fiber lasers. However, the power output of a single fiber laser without amplification or other power increasing techniques is relatively low. U.S. Pat. No. 6,366,356, issued Apr. 2, 2001 to Brosnan et al., discloses a laser system using a diode pumped fiber laser as a master oscillator and a plurality of fiber amplifiers connected to the master oscillator. The outputs from the plurality of fiber amplifiers are collimated by a lens array to produce a single high power laser beam output.

As briefly described above, coherent combination of multiple laser beams provides a power-law increase in power output. Therefore, Brosnan describes an additional electronic apparatus to correct the phase of the output provided by each fiber amplifier. The ability to compensate for the relative optical phase shifts among the array of fiber amplifiers provides for the preferred coherent combination of outputs. However, the additional circuitry required to detect and compensate for the relative optical phase shifts increases the complexity of the system disclosed by Brosnan. Also, fiber amplifiers are generally less efficient than fiber oscillators (lasers). Therefore, the array of fiber amplifiers disclosed by Brosnan would provide less power than an array of fiber oscillators of the same number. Hence, the system disclosed by Brosnan would be considered more complex and less efficient than a system based on a plurality of fiber oscillators.

Other high power laser systems based on fiber lasers avoid fiber amplifiers by using multiple-core coupler fiber oscillators. U.S. Pat. No. 5,566,196, issued Oct. 15, 1996 to Scifres, describes a fiber laser with two or more generally parallel, nonconcentric doped core regions. The use of multiple cores spreads the light over a larger area of the fiber, thereby reducing the laser power density and reducing the nonlinear optical effects that would otherwise occur at high light intensities. Scifres discloses that the cores may be positioned far enough apart to ensure that light propagating in one core intersects only minimally with light propagating in the other cores, so that each core forms a completely independent laser. However, this configuration does not provide for phase-locking between the light propagating in each of the cores. Scifres also discloses spacing the neighboring cores sufficiently close such that interaction of the light in the cores does occur, thereby providing a phase-locked array of laser emitters in the fiber.

A key problem with multiple-core fiber oscillator systems, such as the system disclosed by Scifres, is heat dissipation. Since the cores are disposed parallel and adjacent to each other along the entire active region of the cores, the heat from each core will be partially transmitted to the adjacent cores. Hence, the power of the multiple-core fiber oscillator systems will be limited by the ability to dissipate the heat generated by the active regions away from the multiple-core fiber, similar to the way that glass rod lasers are limited in average power scaling.

U.S. Pat. No. 6,272,155, issued Aug. 7, 2001, to Sekiguchi describes the creation of a high intensity optical source through the creation of a high density group of incoherent fibers. See, for example, FIG. 3 of U.S. Pat. No. 6,272,155. If the fibers do not interact, they will lase with their own characteristic frequencies (spectrum of longitudinal modes) and thereby be incoherent. Sekiguchi discloses that the fibers are to be positioned relative to one another such that they do not interact. The total power output will then increase proportional to the number of sources (N) simply due to energy conservation.

Combining multiple optical sources into a single optical output having optical power nearly equal to the sum of the powers of the individual sources can be accomplished through the combination of the optical sources. One apparatus known in the art for combining N sources is a 1×N fiber coupler. U.S. Pat. No. 5,175,779, issued Dec. 29, 1992 to Mortimore, describes a 1×N single-mode star coupler configured to couple light into multiple fibers at two wavelengths. In Mortimore, multiple single mode fibers are stripped of their primary coating and constrained around a single central fiber, which is also a single mode fiber stripped of its primary coating. All fibers are inserted into a tight fitting silica base glass capillary tube. The fiber and the tube are heated and pulled to form a tapered coupler. During the pulling process, light transmitted through the central fiber and at least one of the multiple fibers disposed around the central fiber is measured. When the light in the central fiber and the fiber disposed around the central fiber is nearly equal at the two desired wavelengths, the pulling process is terminated.

The 1×N star coupler disclosed by Mortimore and other similar apparatus known in the art provide the capability to combine optical sources at relatively lower powers. Furthermore, as the optical power in each fiber is increased, this prior art has the disadvantage that the combined power must propagate in the core of the single central fiber. When the combined optical power is high, undesirable nonlinear effects in, or damage to, the single central fiber may occur. For example, at high optical powers, Stimulated Brillouin Scattering (SBS) may arise. This nonlinear optical effect results from the interaction of the light in the central fiber with acoustic waves in the fiber medium through which the light is propagating, producing inelastic backscattering of the light with a frequency shift equal to the frequency of the acoustic waves. The backward propagating light is amplified at the expense of the forward propagating light. Further, the acoustic waves may also be amplified by this effect, generating an acoustic intensity that can easily damage the single central fiber.

Splitting a single optical source into multiple optical outputs may also be provided by the 1×N star coupler described above, but the power handling capabilities of the coupler are again limited by the single central fiber. Further, if the optical source is a single plane wave, additional optical devices are needed to couple the plane wave into the single central fiber.

Devices are known in the art which allow an optical plane wave to be coupled to multiple fibers without using a single central fiber. For example, U.S. Pat. No. 5,852,699, issued Dec. 22, 1998 to Lissotschenko et al., discloses a coupling element having an array of lenses where each lens focuses an incident light beam onto a specific fiber in a fiber bundle. Hence, the coupling element splits the incident plane wave into multiple light beams, each of which is directed to a separate optical fiber.

The coupling efficiency for coupling an optical plane wave into multiple fibers using the approach disclosed by Lissotschenko (or other similar techniques known in the art) is generally limited to about 30%. Even assuming perfect alignment, the coupling efficiency is limited by the packing of both the fibers in the fiber bundle and the lenses in the array of lenses. The coupling efficiency is further limited by clipping that occurs at the edge of each lens in the array. Finally, the coupling efficiency is reduced because the fiber modes only accept a Gaussian-profiled fraction of the input beam. Therefore, even though the optical plane wave may be a high power optical beam, a significant portion of that power is lost when coupling the beam into multiple fibers using apparatus and methods known in the art.

The art described above generally allows multiple laser sources to be combined, however, active phase controls for each of the laser sources is typically required to obtain a high power output with flat wavefront coherent output. That is, active controls on the laser lengths are needed or the lasers need to be made to be equal in length to much less than a wavelength. Such approaches complicate the design and/or fabrication of systems in which multiple laser sources are used to generate high power outputs. Therefore, there is a need in the art for a method and apparatus for generating a high power laser output with a flat wavefront coherent output.

SUMMARY

Embodiments of the present invention provide a method and apparatus for coupling a plurality of laser devices and utilizing interactions between the plurality of laser devices to form a flat wavefront coherent optical output. Embodiments of the present invention also employ one or more interferometrically dark fibers to ensure that the outputs from interferometrically lit fibers have fairly uniform intensity.

As described herein, an interferometrically dark fiber is a member of a fiber array, which, under uniform illumination, transmits no light because of destructive interference between the light coupled directly into that fiber from the external illumination and the light coupled into the fiber via evanescent coupling from adjacent fibers.

An embodiment according to the present invention comprises a multiple-fiber device, a stretched, fused and cleaved coupler, designed to act as an output window to a fiber laser array or fiber-coupled laser array. By careful choice of the type of fibers, their stretch, their length and their position, the coupler can be designed to facilitate the in-phase oscillation of the lasers in the array. Specifically, the interference of the various fibers is made such that, if (and only if) light illuminating the cleaved face is uniform and collimated, then certain of the attached fibers will be interferometrically dark.

The other fibers, the interferometrically lit ones, are made to have fairly uniform intensity under the same collimated illumination.

The coupler according to an embodiment of the present invention mixes the light reflected back into the various independent lasers of an array in such a way that a spectrally coherent and spatially flat wavefront is emitted from the array. Lasers are nonlinear oscillators that can self-organize into a coherent state, that is, one with definite phase relationships between each other. However, the ideal laser array output is not just one with phases that are defined relative to each other, but one with phases that are exactly equal to each other. The coupler according to an embodiment of the present invention is preferably designed to increase the losses in the composite laser array if the phases are not equal. Conversely, then, the flat wavefront output is the least lossy state the laser array can assume. Thus, the coupler discriminates in favor of a flat wavefront.

By reciprocity, if the direction of the light is reversed, then the output of the coupler will be uniform and collimated. The interferometrically dark fibers will be left broken or lossy. In an embodiment of the present invention, the interferometrically lit fibers will be attached to the output of a laser device. When the light reaching and reflected from the cleaved coupler face is ideally collimated and uniform, there is no net loss because those fibers were dark anyway. However, if the light reflected from the cleaved coupler face deviates from the ideal, then light propagates in the broken or lossy fibers, and there is a net loss of light.

BRIEF DESCRIPTION OF THE DRAWINGS

The features and advantages of the present invention will become better understood with regard to the following description, appended claims, and accompanying drawings.

FIG. 4A shows the impact of the inclusion of a gain block in one of the fiber paths of the laser array depicted in FIG. 3A.

FIG. 4B shows the impact of the inclusion of a gain block in one of the fiber paths in a laser array when the coupler combining the outputs from the lasers is not configured to produce a collimated output.

FIG. 5A shows a dark fiber according to an embodiment of the present invention.

FIG. 5B shows the optical outputs from an optical coupler having various fiber offsets.

DETAILED DESCRIPTION

Figure 1:
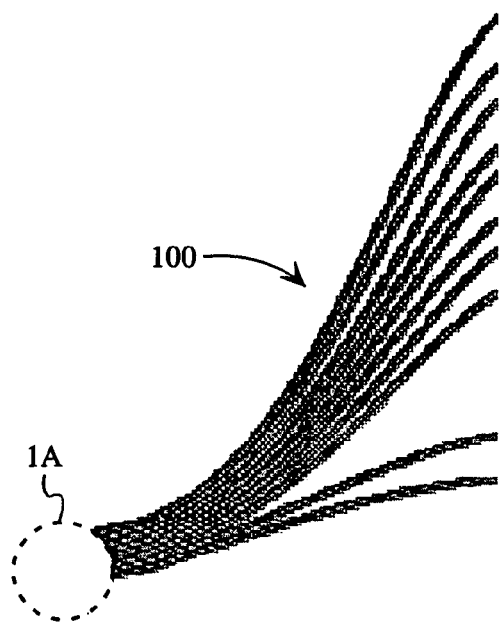
FIG. 1 shows an optical coupler comprising a bundle of fused fibers for use in embodiments of the present invention.

The present invention will now be described more fully hereinafter with reference to the accompanying drawings, in which preferred embodiments of the invention are shown. This invention may be embodied in many different forms and should not be construed as limited to the embodiments set forth herein. Further, the dimensions of certain elements shown in the accompanying drawings may be exaggerated to more clearly show details. The present invention should not be construed as being limited to the dimensional relations shown in the drawings, nor should the individual elements shown in the drawings be construed to be limited to the dimensions shown.

Figure 1A:
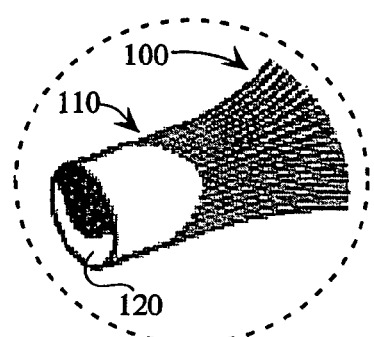
FIG. 1A shows an enlarged view of the fused end of the fiber bundle depicted in FIG. 1.

FIG. 1 illustrates an optical coupler for use in embodiments of the present invention, in which the optical coupler 100 comprises a large bundle of regularly arrayed optical fibers 110. The optical fibers 110 are preferably single-mode fibers. The optical fibers 110 are fused at one end and stretched. The fused end is cut and polished (or cleaved) to produce a facet 120 through which a free space optical beam can be received or transmitted. FIG. 1A shows an enlarged view of the coupler 100 having the fused fibers 110 and the facet 120. FIG. 1A also shows a taper of the bundle at the point where it is cut and polished to produce the facet 120. The optical coupler 100 illustrated in FIGS. 1 and 1A is described in more detail in co-pending U.S. patent application Ser. No. 10/759,511.

The optical coupler 100 depicted in FIGS. 1 and 1A may be fabricated by assembling the optical fibers 110 in the fiber bundle in a regular array. Such arrays include hexagonal close packing, square packing, and a three-nearest-neighbor packing. Although manufacturing tolerances may result in a certain amount of randomness in the array, the device is still useful even if the optical fibers 110 are not perfectly arranged. This array of fibers 110 is then fused together and stretched using techniques well known in the art, such as those techniques used for the fabrication of tapered fiber couplers. Fusing the fibers 110 provides that the light in one fiber may be coupled to other fibers in the stretched region of the fiber. After the bundle of fibers 110 has been fused and stretched, the bundle is cut and polished, or cleaved, at a selected location to provide the facet 120. The facet 120 provides for the entrance of a single beam into the apparatus and the distribution of that beam among the optical fibers in the array. The facet 120 also provides for the exit of a single beam from the apparatus, which may be fed by optical sources coupled to the multiple fibers 110.

Figure 2:
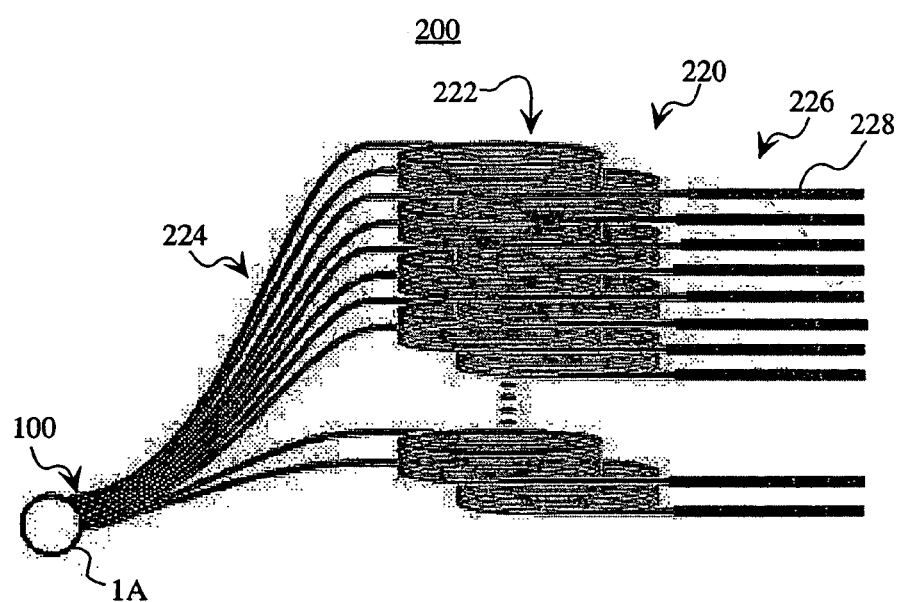
FIG. 2 shows a laser array according to an embodiment of the present invention.

A laser array 200 according to an embodiment of the present invention, which incorporates the optical coupler shown in FIGS. 1 and 1A, is shown in FIG. 2. The laser 200 comprises a plurality of optical fiber paths 220 and the coupler 100. Each optical fiber path 220 comprises: a doped segment 222, which receives laser pumping energy; a coupling connection segment 224, which connects the optical fiber path 220 to the coupler 100; and a reflector connection segment 226, which contains a fiber grating reflector 228 or similar high reflectivity device. Each optical fiber path 220 may comprise a single optical fiber with the described segments or may comprise multiple optical fibers coupled together to form the described segments using techniques known in the art.

Each optical fiber path 220 forms a fiber oscillator due to the application of pump energy to the doped segment 222 and the resonant cavity formed by the surface of the facet 120 at the coupler 100 and the fiber grating reflector 228 in each optical fiber path 220. Therefore, the coupler 100 provides the ability to combine the laser light from each optical fiber path 220 into a single laser beam. The degree of coupling between the laser light from each optical fiber path 220 can be controlled by the amount of stretch and the length of the bundled fibers at the coupler 100. The fibers are tuned to give the required degree of coupling for a particular connectivity. Preferably, the fibers are not narrowed so much that they no longer support a propagating mode. The laser array 200 depicted in FIG. 2 is described in additional detail in co-pending U.S. patent application Ser. No. 10/759,510.

According to embodiments of the present invention, the output coupler 100 is configured such that it yields a specific optical response to illumination of the cleaved face by a uniform collimated beam. Part of the collimated light is reflected or scattered, but part of the light enters into the coupler 100, and propagates through it, guided loosely by the cores of the bundled fibers 110. Along the length where fibers 110 are fused, there is coupling and interference between the light in each fiber 110 and each of the other fibers 110. As the fibers 110 separate from each other away from the fused region, each fiber 110 will have more or less of the incident light propagating inside. In a preferred embodiment of the present invention, each fiber will either be equally light or completely dark, with no mixture of mid-range intensities.

Figure 3A:
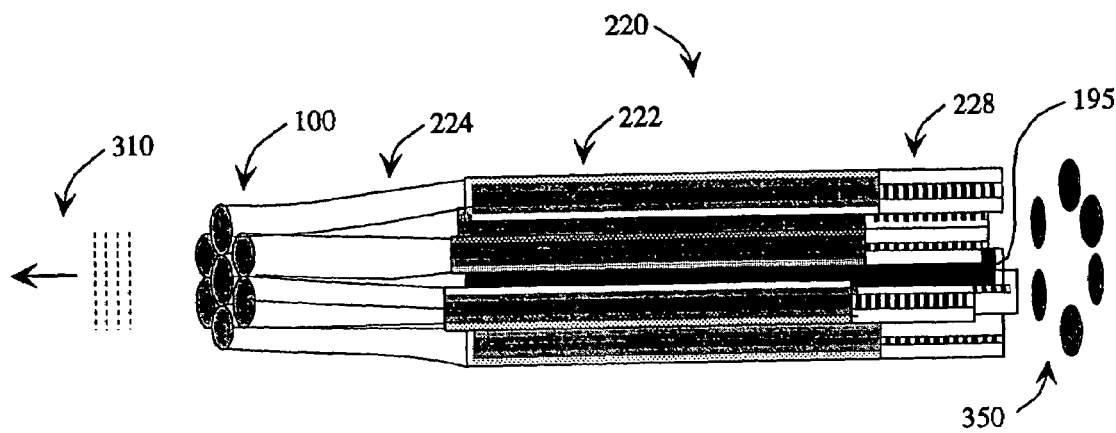
FIG. 3A shows a laser array depicted in FIG. 2 configured to produce a collimated output.

FIG. 3A shows an embodiment of the invention configured as the laser array depicted in FIG. 2. Multiple optical fiber paths 220, comprising doped segments 222, which receive laser pumping energy; coupling connection segments 224, and fiber grating reflectors 228, are coupled to the optical coupler 100 with the coupling connection segments 224. The application of laser pump energy at the doped segments 222 creates laser energy within the optical fiber paths 220. However, one optical fiber 195 is configured to be interferometrically dark. The laser energy in the other optical fiber paths 220 will self organize such that laser energy in the optical fiber paths 220 will have equal or nearly equal phase. The laser light output 310 from the coupler 100 will be coherent such that the intensity from each lit fiber will be uniformly illuminated and in phase. The light pattern 350 of the light that leaks from the optical fiber paths 220 shows the absence of light in the optical fiber 195 that is interferometrically dark.

Figure 3B:
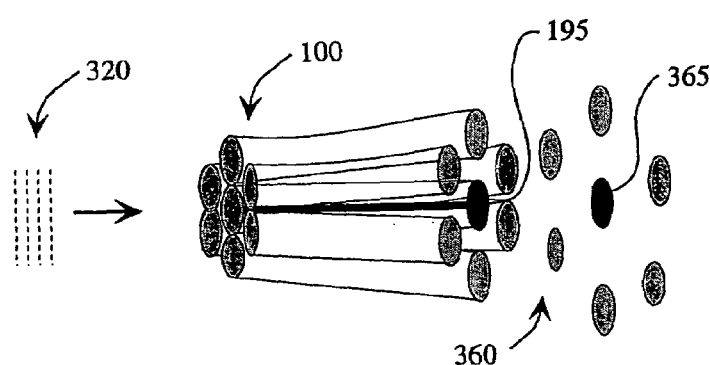
FIG. 3B shows the application of a collimated input to the coupler used in the array shown in FIG. 3A.

The presence of an interferometrically dark fiber in the optical coupler 100 may be found by reciprocity. That is, rather than using the optical coupler 100 to produce a collimated output, a collimated input may be applied to the coupler 100. FIG. 3B illustrates the application of collimated light 320 to the optical coupler 100 having one interferometrically dark fiber 195. As discussed above, each interferometrically lit fiber will have a portion of the incident light propagating within the fiber and produce a light output while each interferometrically dark fiber 195 will produce no output. Therefore, FIG. 3B shows a light pattern 360 comprising a beam output from each lit fiber and no beam 365 from the interferometrically dark fiber 195.

Figure 3C:
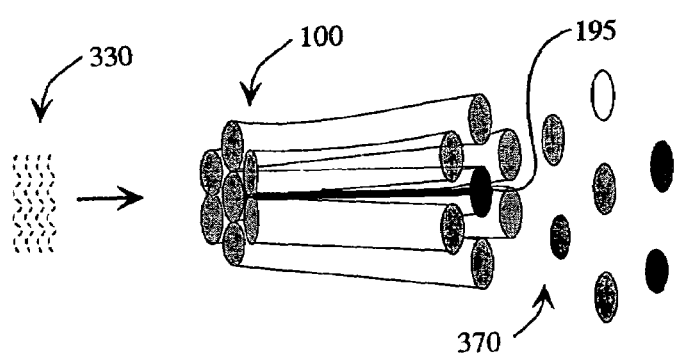
FIG. 3C shows the application of an aberrated input to the coupler used in the array shown in FIG. 3A.

As discussed above and shown in FIG. 3B, the application of a collimated light input to the optical coupler 100 with one or more interferometrically dark fibers will result in the optical fibers coupled to the coupler 100 being either completely lit or completely dark. There should be no fibers that have a light intensity that is in between completely lit or completely dark. On the other hand, the application of an aberrated light input to the coupler 100 with one or more interferometrically dark fibers will result in the fibers having different light intensities. FIG. 3C shows the application of aberrated light 330 to the optical coupler 100 with one interferometrically dark fiber 195. The resulting light pattern 370 shows that the light output from each of the fibers has different intensities and the interferometrically dark fiber 195 also produces an output.

A coherent array wavefront is sometimes referred to as a supermode. According to embodiments of the present invention, laser arrays using the optical coupler as described above will provide extremely strong discrimination in favor the desired flat wavefront supermode. In laser arrays according to embodiments of the present invention, the lowest loss occurs when the output wavefront from the laser array is flat. FIGS. 4A and 4B illustrate that the lowest loss array mode is one in which the output waveform is flat. FIG. 4A illustrates a laser array 400 similar to that depicted in FIG. 3A producing a collimated light output 310. However, a gain block 197 is attached to one of the optical fibers 220 of the coupler 100. With the collimated output 310, no light will be reflected into the fiber with the gain block 197, so no reflected light will be lost in the fiber with the gain block 197. The light pattern 350 shows that no light is present in the fiber path 220 with the gain block 197. FIG. 4B illustrates that an aberrated light output 335 will cause light to be reflected into the fiber path 220 with the gain block 197, inducing loss in the laser array 400. The loss is shown by the uneven distribution of light intensities in the light pattern 390 of the light that leaks from the optical fiber paths 220. Hence, FIGS. 4A and 4B show that the lowest loss laser array mode is one that is flat, not aberrated.

The creation of a laser array with an optical coupler as described above with one or more interferometrically dark fibers requires unequal coupling or unequal phase distribution between elements of the laser array. Thus, an optical coupler with one or more dark fibers, i.e., a dark fiber coupler, may be formed with a mixture of fiber types or fiber properties with, for example, two or more propagation constants, different core or cladding dimensions, or asymmetrical positions of the fibers in the coupler. Imperfections of the fibers or the fiber pulling process to create a tapered fused fiber bundle may create the requisite mixture of fiber properties unintentionally.

As illustrated in FIG. 3B, an embodiment of a dark fiber coupler according to the present invention may be found by creating a tapered, fused, and cleaved fiber bundle, such as illustrated in FIGS. 1 and 1A, and testing the fiber bundle to determine if collimated illumination of the optical coupler yields one or more interferometrically dark fibers. That is, by reciprocity, if the optical coupler is found to produce one or more dark fiber outputs (such as pattern 365 shown in FIG. 3B) upon the application of a collimated light input, the use of that coupler should produce a collimated light output when used in laser arrays according to embodiments of the present invention. However, it may be difficult to consistently produce a coupler with the requisite interferometrically dark fibers.

A dark fiber coupler 170 according to an another embodiment of the present invention is depicted in FIG. 5A. Identical fibers 177 are used in all positions of the fibers in the coupler, except for one or more fibers 179 that have characteristics that provide that those fibers 179 will be interferometrically dark. FIG. 5A shows the interferometrically dark fiber 179, as having a larger diameter than the other fibers 177 and offset from the other fibers 177, but other characteristics of the fiber may support the creation of an interferometrically dark fiber. FIG. 5B shows calculated optical intensity from the coupler 170 with the seven fiber bundle depicted in FIG. 5A and with varying offsets of the dark fiber 179 from the other fibers 177. As shown in FIG.

5B, the offset fiber 179 may produce no output or a less intense output upon the input of collimated light to the dark fiber coupler 170.

A preferred embodiment of a dark fiber coupler according to an embodiment of the present invention comprises an array of optical fibers laid out in a hexagonal pattern and tapered, fused, and cleaved as described above. This embodiment is particularly appealing because it is relatively straightforward to fabricate, is scalable to very large arrays of fibers, and may use commercial-off-the-shelf optical fibers.

Figure 6:
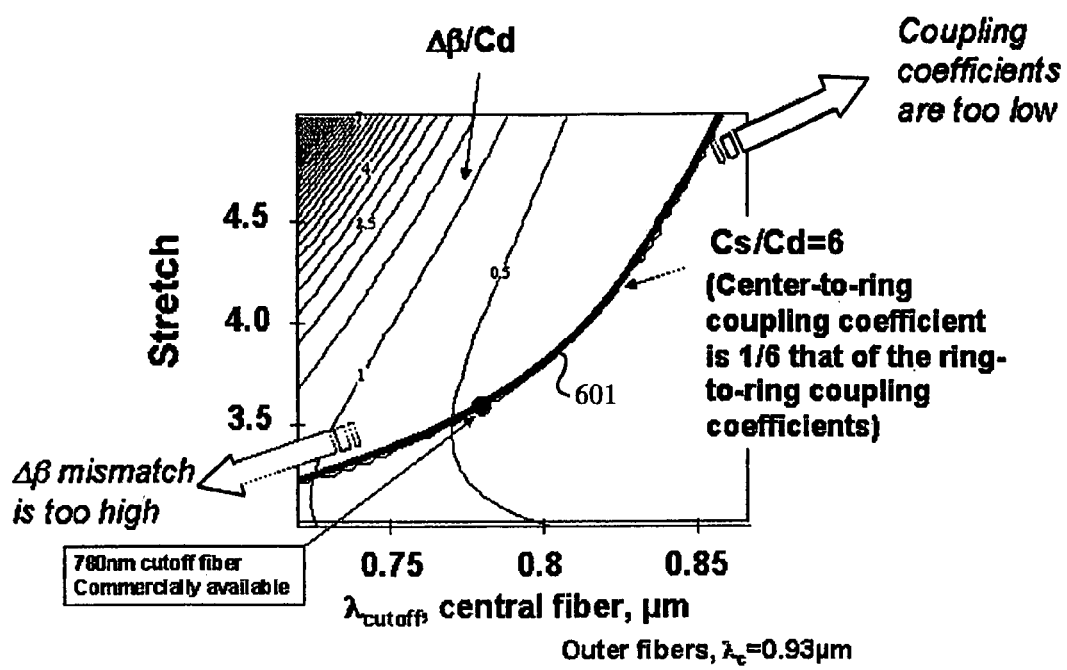
FIG. 6 shows a graph of the cutoff wavelength of a central fiber versus the stretch applied to the fiber for the desired coupling to surrounding fibers in accordance with an embodiment of the present invention.

The optical fibers in the array are preferably laid out in a symmetrical pattern with a lower $2^{nd}$-mode cutoff fiber surrounded by a ring of a higher $2^{nd}$-mode cutoff fiber, and set in a much larger glass matrix. In a preferred embodiment, the fibers that are to be dark have ⅙ the coupling to the fibers around them as the ring of surrounding fibers has to each other. This differing degree of coupling can be found, for example, using fibers with different cutoff wavelengths. FIG. 6 shows a line 601 representing solutions in which Corning Hi1060 ($2^{nd}$-mode cutoff ~0.93 μm) fiber (available from Corning, Inc. of Corning, N.Y.) is paired with another fiber of a lower cutoff wavelength to give this factor of 6 ratio between same-fiber and different-fiber coupling coefficients. The desired coupling coefficients can be obtained for a range of stretch and $2^{nd}$-mode cutoff values.

The propagation through the dark fiber coupler according to the preferred embodiment described above was modeled. In the modeling, the multiple cores of the fused structure were assumed to start with propagating light that is equal in intensity and phase. Then, analysis was performed to determine how the light mixes and interferes as it propagates along the structure, loosely guided by those cores.

FIGS. 7A-7D show some examples of calculated output intensity from each of the fibers for different configurations of optical couplers according to the present invention, in response to uniform and collimated illumination. The figures are not the actual light patterns, just a representation of the intensity from each fiber, laid out in the same pattern that the cores had within the fused region. The actual intensity patterns may vary from the theory for a number of reasons, such as the presence of the capillary walls, or nonuniform or inaccurate fiber or device stretching. However, the fabrication parameters (fiber type, stretch, cleave length) can be varied until the dark fibers appear in the illumination test.

Figure 7A:
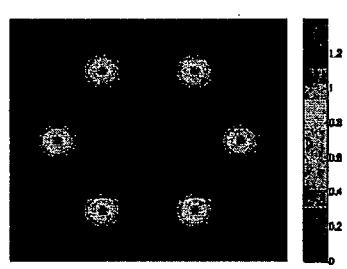
FIGS. 7A-7D show the calculated optical outputs for various configurations of couplers according to the present invention.

FIG. 7A illustrates the calculated output from a coupler made from 7 fibers and fed with 6 lasers. In FIG. 7A, the center fiber cutoff wavelength $\lambda_c$=812 nm and the cutoff wavelength for the fibers arranged in a ring around the center fiber $\lambda_c$=935 nm. The fibers in the coupler are stretched 3.4 times their original length and the overall length of the coupler is 12.8 mm.

Figure 7B:
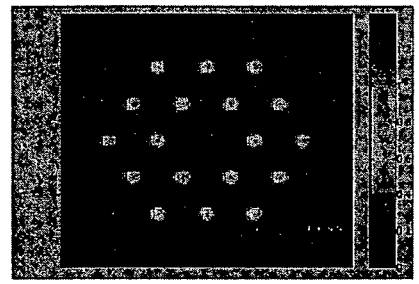

FIG. 7B illustrates the calculated output from a coupler made from 19 fibers and fed with 18 lasers. In FIG. 7B, the center fiber cutoff wavelength $\lambda_c$=737 nm and the cutoff wavelength for the fibers arranged in an inner ring around the center fiber $\lambda_c$=857 nm and the cutoff wavelength for the fibers arranged in an outer ring around the inner ring $\lambda_c$=935 nm. The fibers in the coupler are stretched 3.2 times their original length and the overall length of the coupler is 25 mm.

Figure 7C:
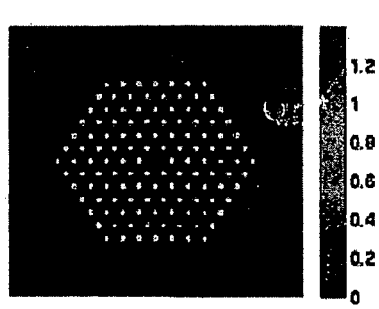

FIG. 7C illustrates the calculated output from a coupler made from 127 fibers and fed with 126 lasers. In FIG. 7C, the center fiber cutoff wavelength $\lambda_c$=737 nm and the cutoff wavelength for the fibers arranged in the inner rings around the center fiber $\lambda_c$=857 nm and the cutoff wavelength for the fibers arranged in an outer ring around the inner rings $\lambda_c$=935 nm. The fibers in the coupler are stretched 3.3 times their original length and the overall length of the coupler is 14.4 mm.

Figure 7D:
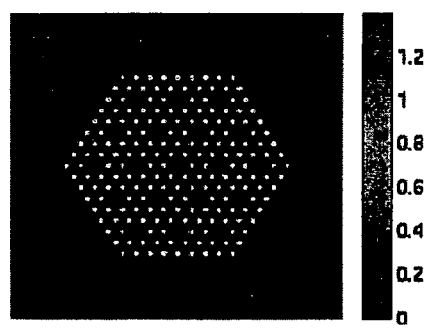

FIG. 7D illustrates the calculated output from a coupler made from 217 fibers and fed with 198 lasers. In FIG. 7D, the center fiber cutoff wavelength $\lambda_c$=737 nm and the cutoff wavelength for the fibers arranged in an inner ring around the center fiber $\lambda_c$=857 nm and the cutoff wavelength for the fibers arranged in an outer ring around the inner ring $\lambda_c$=912 nm. The fibers in the coupler are stretched 3.3 times their original length and the overall length of the coupler is 7.9 mm.

Dark fiber couplers according to embodiments of the present invention mix the light from various independent fiber laser or fiber-coupled lasers. Such dark fiber couplers have a reflective surface that is the output of the combined lasers. The reflective surface both reflects light back into the fibers of the dark fiber coupler and provides a combined laser output. The dark fiber coupler couples fractions of the combined light back into the fibers to stimulate self-organization of the laser light. Finally, the dark fiber coupler is configured such that it discriminates in favor of a flat wavefront output.

From the foregoing description, it will be apparent that the present invention has a number of advantages, some of which have been described herein, and others of which are inherent in the embodiments of the invention described or claimed herein. Also, it will be understood that modifications can be made to the apparatus and method described herein without departing from the teachings of subject matter described herein. As such, the invention is not to be limited to the described embodiments except as required by the appended claims.

What is claimed is:

1. A method of providing a collimated output from a plurality of lasers, comprising:

coupling each output from each laser of the plurality of lasers to a separate optical fiber in a plurality of optical fibers combining the plurality of optical fibers to form a reflective surface receiving the outputs from the plurality of lasers;

coupling fractions of light output from each optical fiber into other optical fibers to stimulate self-organized phasing of the plurality of lasers; and configuring the combination of the plurality of optical fibers to discriminate in favor of a flat wavefront output from the combination of the plurality of optical fibers;

wherein at least one optical fiber in the plurality of optical fibers is an interferometrically dark fiber;

wherein the interferometrically dark fiber is configured to transmit no light due to destructive interference between light from a laser coupled to the interferometrically dark fiber and the fractions of light output from adjacent optical fibers.

2. The method according to claim 1, wherein the combination of the plurality of optical fibers is provided by a tapered, fused, and cleaved bundle of optical fibers.

3. The method according to claim 2, wherein at least one optical fiber in the plurality of optical fibers has one or more different properties than other optical fibers in the plurality of optical fibers.

4. The method according to claim 3, wherein the different properties include positions of the optical fibers with respect to each other.

5. An optical coupler comprising:
a plurality of optical fibers, each optical fiber having a first end and a second end, the plurality of optical fibers being fused together along a section of each optical fiber proximate the first end of each optical fiber to form a fused section having a fiber axis, the fused section of the plurality of optical fibers being tapered to form a tapered region;
a facet at an end of the fused section, the facet disposed in a direction perpendicular to said fiber axis,
wherein at least one optical fiber of the plurality of optical fibers comprises an interferometrically dark fiber;
wherein the interferometrically dark fiber is configured to transmit no light due to destructive interference between light from a laser coupled to the interferometrically dark fiber and at least a portion of light output from adjacent optical fibers.

6. The optical coupler according to claim 5, wherein the interferometrically dark fiber has one or more different properties than other optical fibers in the plurality of optical fibers.

7. The optical coupler according to claim 6, wherein the different properties include positions of the optical fibers with respect to each other.

8. A laser array comprising:
a plurality of laser active optical paths, wherein each laser active optical path comprises:
 a doped segment adapted to receive laser pumping energy;
 a reflector connection segment; and
 a coupling connection segment, and
an optical coupler, the optical coupler comprising:
 a plurality of optical fibers, each optical fiber having a first end and a second end, the first end of each optical fiber being coupled to one laser active optical path at the coupling connection segment of the laser active optical path and the plurality of optical fibers being fused together along a section of each optical fiber proximate the second end of each optical fiber to form a fused section having a fiber axis, the fused section of the plurality of optical fibers being tapered to form a tapered region; and
 a facet, said facet being formed by cleaving or cut and polishing said tapered region in a direction perpendicular to said fiber axis,
wherein at least one optical fiber of the plurality of optical fibers comprises an interferometrically dark fiber;
wherein the interferometrically dark fiber is configured to transmit no light due to destructive interference between light from a laser coupled to the interferometrically dark fiber and at least a portion of light output from adjacent optical fibers.

9. The laser array according to claim 8, wherein the interferometrically dark fiber differs from the other optical fibers of the plurality of optical fibers by at least one property.

10. The laser array according to claim 9, wherein the at least one property includes position of the fibers with respect to each other.

11. An apparatus for producing a collimated output comprising:
means for receiving a plurality of laser outputs;
means for combining the plurality of laser outputs; and
means for directing fractions of each laser output from the laser outputs to other laser outputs to stimulate self-organized phasing of the laser outputs;
wherein the means for combining the plurality of laser outputs products a combined output and the means for combining is configured to discriminate in favor of a flat wavefront combined output;
wherein means for receiving a plurality of laser outputs comprises at least one interferometrically dark fiber;
wherein the interferometrically dark fiber is configured to transmit no light due to destructive interference between an output of one of the laser outputs and a portion of light output from other means for receiving a plurality of laser outputs.

* * * * *